(12) United States Patent
Pianetto et al.

(10) Patent No.: US 7,222,644 B2
(45) Date of Patent: May 29, 2007

(54) HIGH-PRESSURE HOSE AND PRESSURE WASHER

(75) Inventors: John Pianetto, Hoffman Estates, IL (US); Morgan McCarthey, Schaumburg, IL (US); Gus Alexander, Inverness, IL (US)

(73) Assignee: FAIP North America, Inc., Elk Grove Village, IL (US)

( * ) Notice: Subject to any disclaimer, the term of this patent is extended or adjusted under 35 U.S.C. 154(b) by 416 days.

(21) Appl. No.: 10/314,565

(22) Filed: Dec. 9, 2002

(65) Prior Publication Data

US 2004/0124287 A1   Jul. 1, 2004

(51) Int. Cl.
*F16L 11/00*   (2006.01)

(52) U.S. Cl. .............. 138/127; 138/125; 138/126; 239/351; 239/355

(58) Field of Classification Search ........ 138/125–127; 239/302–379
See application file for complete search history.

(56) References Cited

U.S. PATENT DOCUMENTS

| | | | |
|---|---|---|---|
| 3,580,289 A | 5/1971 | James, Jr. et al. | |
| 4,258,755 A | 3/1981 | Higbee | |
| 4,262,704 A | 4/1981 | Grawey | |
| 4,366,746 A | 1/1983 | Rosecrans | |
| 4,380,252 A | 4/1983 | Gray et al. | |
| 4,384,595 A * | 5/1983 | Washkewicz et al. | 138/127 |
| 4,447,378 A | 5/1984 | Gray et al. | |
| 4,488,577 A | 12/1984 | Shilad et al. | |
| 4,517,039 A * | 5/1985 | Satzler | 156/149 |
| 4,699,178 A | 10/1987 | Washkewicz et al. | |
| 4,898,212 A | 2/1990 | Searfoss et al. | |
| 4,905,736 A * | 3/1990 | Kitami et al. | 138/137 |
| 5,170,011 A | 12/1992 | Martucci | |
| 5,381,834 A | 1/1995 | King | |
| 5,395,052 A | 3/1995 | Schneider et al. | |
| 5,413,147 A | 5/1995 | Moreiras et al. | |
| 5,419,495 A | 5/1995 | Berfield | |
| 5,432,709 A * | 7/1995 | Vollweiler et al. | 702/32 |
| 5,535,177 A * | 7/1996 | Chin et al. | 367/81 |
| 5,573,039 A * | 11/1996 | Mang | 138/141 |
| RE35,527 E | 6/1997 | Martucci | |
| 5,655,572 A | 8/1997 | Marena | |
| 5,728,066 A * | 3/1998 | Daneshvar | 604/96.01 |
| 5,830,946 A * | 11/1998 | Ozawa et al. | 525/65 |
| 5,964,409 A * | 10/1999 | Alexander et al. | 239/154 |
| 6,109,306 A | 8/2000 | Kleinert | |
| 6,166,143 A * | 12/2000 | Watanabe et al. | 525/208 |

(Continued)

FOREIGN PATENT DOCUMENTS

DE   24 29 680   1/1976

(Continued)

*Primary Examiner*—Thomas Denion
*Assistant Examiner*—Zelalem Eshete
(74) *Attorney, Agent, or Firm*—Leydig, Voit & Mayer, Ltd.

(57) ABSTRACT

A flexible pressure-washer hose and pressure washing apparatus are disclosed. The hose is of concentric laminar construction and comprises an inner core, an intermediate metallic sheath covering the core, and a jacket covering the intermediate sheath. The disclosed hose has a burst pressure of at least 12,000 psi, yet is highly flexible. The disclosed pressure washer comprises a hose made in accordance with the invention and fluidically connecting a source of pressurized fluid to an operator wand.

24 Claims, 2 Drawing Sheets

U.S. PATENT DOCUMENTS

| | | | |
|---|---|---|---|
| 6,394,108 B1 * | 5/2002 | Butler | 134/22.18 |
| 2003/0129336 A1 * | 7/2003 | Bourgois et al. | 428/35.7 |

FOREIGN PATENT DOCUMENTS

| | | |
|---|---|---|
| GB | 809307 | 2/1959 |
| GB | 2096726 A * | 10/1982 |
| GB | 2303574 A * | 2/1997 |

* cited by examiner

HIGH-PRESSURE HOSE AND PRESSURE WASHER

FIELD OF THE INVENTION

The invention is in the field of pressure washing equipment, and relates specifically to hoses for high-pressure pressure washers.

BACKGROUND OF THE INVENTION

The prior art has provided pressure washers for use in washing surfaces such as wood, tile, concrete and the like. A pressure washer typically comprises a source of a pressurized washing fluid that fluidically communicates with an operator wand via a high-pressure hose. The prior art further has provided numerous hoses for use in conjunction with such pressure washers, which hoses typically comprise a jacketed core of thermoplastic material or other material. Such conventional pressure washer hoses are capable of accommodating the moderately high pressures associated with conventional power washers while leaving a satisfactory margin of safety. Consumer applications mandate a margin of safety of 300% (i.e., a burst strength of 400% or four times the rated pressure). Thus, for example, a hose having a nominal rating of 1000 psi will require, at a minimum, that the hose be able to accommodate a pressure of at least about 4000 psi as measured, for example, in accordance with SAE J17. The prior art has provided a number of pressure washer hoses that have such a nominal rating with a 300% safety margin.

Hoses designed for use in consumer applications must be sufficiently flexible to accommodate the demands of consumer pressure washers. Recently, U.S. Pat. No. 5,964,409, which is hereby incorporated by reference in its entirety, disclosed a satisfactory flexible thermoplastic pressure-washer hose that is designed to operate at pressures greater than about 2000 psi, with the 300% safety margin conventionally required. The hoses therein disclosed are suitable for high pressure applications wherein the pressure generated by the pressure washer exceeds about 2000 psi. The hoses discussed in the '409 patent are suitable for use at pressures ranging up to about 3000 psi.

The prior art has further provided numerous high-pressure hoses for use in applications other than pressure washers, such as industrial fire protection hoses and chemically resistant hoses for industrial equipment. Typically, such a hose comprises an inner tube covered with a reinforcing braided sheath, which, in turn, is covered by an outer jacket. Known consumer grade high-pressure hoses typically are made of very stiff materials to accommodate the high pressures expected under operating conditions, and little or no thought typically is paid to the flexibility of the hose. As a result, such hoses generally are unsuitable for use with consumer pressure washer applications, which mandate that the hose be highly flexible. Moreover, many such hoses tend to kink if bent past an angle of about 90° over a short distance, which kinking is disruptive of the flow of pressurized fluid through the hose and potentially detrimental to the hose and to the equipment serviced by the hose.

The prior art has further taught the use of corrugated hoses in an effort to increase the flexibility of the hose. Such corrugated hoses, however, are expensive to manufacture, and are thus not well suited for use with consumer pressure washers.

Although the hoses disclosed in the prior '409 patent have excellent properties and are satisfactory in pressure-washer applications, there remains room for improvement. Specifically, it is desired to provide a hose that can accommodate for pressures of greater than about 12,000 psi (such hose having a rated operating pressure of greater than about 3,000 psi) and preferably a hose that can accommodate pressures of up to about 16,000 psi (a rated operating pressure of about 4,000 psi), yet that remains flexible and that can be bent through a angle of 180° over a short distance without kinking.

OBJECTS AND SUMMARY OF THE INVENTION

It is a general object of the invention to provide a high-pressure thermoplastic hose that is capable of attaining high operating pressure, yet that remains flexible. The flexibility of the hose may be determined with reference to the minimum bend radius of the hose. The minimum bend radius should be as low as possible, and in preferred embodiments is no greater than 38 mm.

Another object of the invention is to provide a pressure washer having a flexible hose that can accommodate operating pressures of at least about 3000 psi while maintaining a 300% safety margin.

The foregoing general objects are achieved by the present invention, which provides a flexible high-pressure pressure-washer hose that can accommodate pressures of at least about 12,000 psi, thus allowing a pressure washer to have an operating pressure of at least 3000 psi while leaving a 300% safety margin. The hose includes a flexible inner core, a flexible intermediate metallic reinforcing sheath covering the core, and a jacket covering the flexible sheath. In accordance with the invention, the hose is provided with an inner core and sheath that each are sufficiently flexible such that the hose has a minimum bend radius at ambient pressure no greater than about 10 times the radius of the hose, and preferably in the range of about 6.5 to about 8.25 times the radius of the hose. In accordance with another embodiment, the hose has a minimum bend radius of no greater than 38 mm at ambient pressure and a burst pressure of at least about 12,000 psi.

Other objects and advantages of the invention will become apparent upon reading the following detailed description and upon reference to the drawings, in which:

Figure 1:
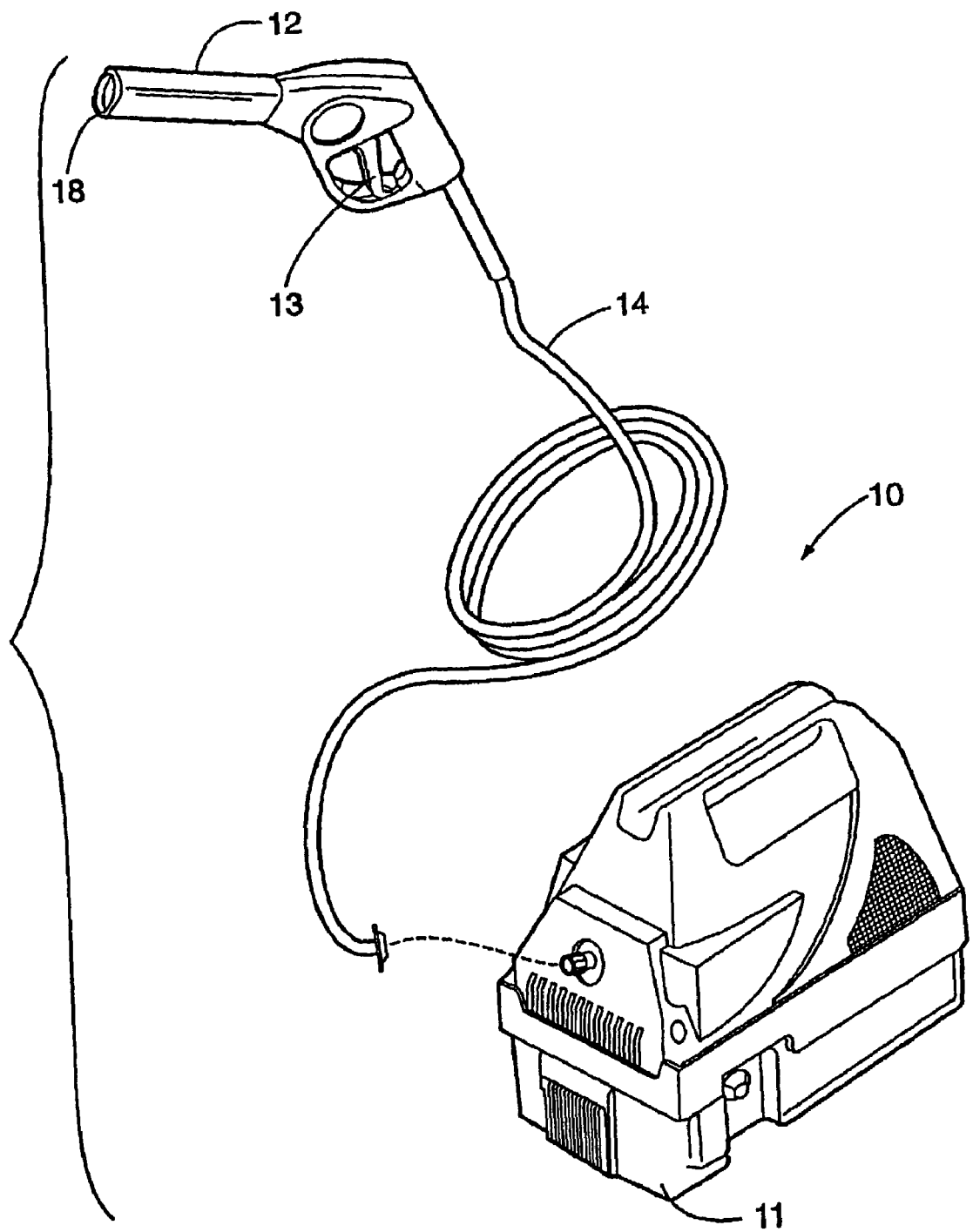
FIG. 1 is a diagramatic depiction of an illustrative pressure washer having a flexible high-pressure hose in accordance with the invention.

While the invention is susceptible of various modifications and alternative constructions, certain illustrated embodiments thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Figure 2:
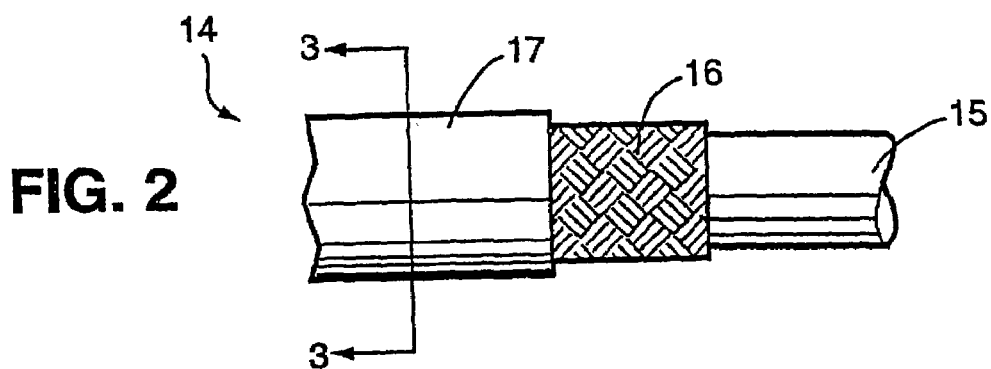
FIG. 2 is an enlarged side elevational view, partially cut away, of the high-pressure hose of the pressure washer shown in FIG. 1.

The invention provides a high-pressure hose that is particularly suited for use in pressure washing equipment, and a pressure washer that includes a high pressure hose. Referring now to FIG. 1, the pressure washer of the invention, shown generally at 10, is of generally conventional configuration and comprises a pump 11 fluidically connected to an operator wand 12 via a high-pressure fluid transfer hose 14. The fluid used in the pressure-washer typically is water, optionally mixed with a washing fluid such as a liquid soap. Fluid is fed from the pump 11, which typically is connected to a water line for generation of a continuous stream of pressurized water. Upon leaving the pump 11, the pressurized cleaning fluid travels through the hose 14 to the operator wand 12. The operator wand 12 typically includes a nozzle 18 and trigger valve 13 for allowing an operator to controllably direct a stream of the pressurized fluid towards a substrate for washing. The hose, wand, and fluid source each may be provided with conventional fittings and couplings to effect appropriate fluid-tight connections therebetween. The hose 14, as depicted in FIG. 2, in this instance is of concentric laminar construction, and includes a central core 15, a reinforcing sheath 16, and an outer jacket 17.

In accordance with the invention, the core 15 is composed of a flexible material, which is preferably a thermoplastic polymeric material and which is capable of accommodating cleaning fluid of pressures of at least about 12,000 psi while maintaining a high degree of flexibility when fluid is not in the hose. Materials suitable for use in conjunction with the core are numerous, and include, for example, high tensile strength thermoplastic elastomers such as those of the SANTOPRENE® family of thermoplastic rubbers. The SANTOPRENE® elastomers having a tensile strength of at least about 14 MPa and a tear strength of at least about 40 kN/m at 25° C. Other suitable materials include reinforced polypropylene and nylons, such as nylon-6 and nylon-6, 6. One suitable polyethylene is a linear low-density polyethylene sold by Dow under the designation DNDB-7441-NT7. This polymer has a density of 0.92 g/cc. The polypropylene or nylon or other material may be reinforced with rubber, carbon black, or other suitable materials.

The invention is not limited to the foregoing thermoplastic elastomers, and indeed any material having suitable flexibility and strength and resistance to the intended fluid can be used in conjunction with the invention. The material preferably is a thermoplastic material that is extrudable, i.e., amenable to extrusion to form the core of a high pressure hose. For example, other materials suitable for use in formulating the core include rigid polymers, such as polyvinylchloride and copolymers of polyvinylchloride with other suitable polymers, which rigid polymers are conventionally employed in less flexible high-pressure hoses. To render such materials sufficiently flexible for use in conjunction with pressure-washing applications, the rigid polymer is blended with a plasticizer in an amount effective to impart sufficient flexibility to the rigid polymer such that the finished hose has the flexibility desired. When formulating a core material, the rigid polymer is preferably present in the core material in an amount ranging from about 40% to about 60% by weight, and the plasticizer is preferably present in an amount ranging from about 20% to about 40% by weight. The core may include other materials, such as stabilizers, modifiers, and other ingredients as would be within the ordinary skill in the art.

When the core is constructed of materials such as polyvinylchloride or strong thermoplastic elastomers, it will be capable of accommodating hot pressurized aqueous washing fluids, and most preferably water. For pressure washer applications, the hose generally need not be able to accommodate oil-based fluids. In preferred embodiments of the invention, the hose will be able to accommodate washing fluids with temperatures of at least about 100° F., more preferably, at least about 120° F., and most preferably at least about 140° F.

Figure 3:
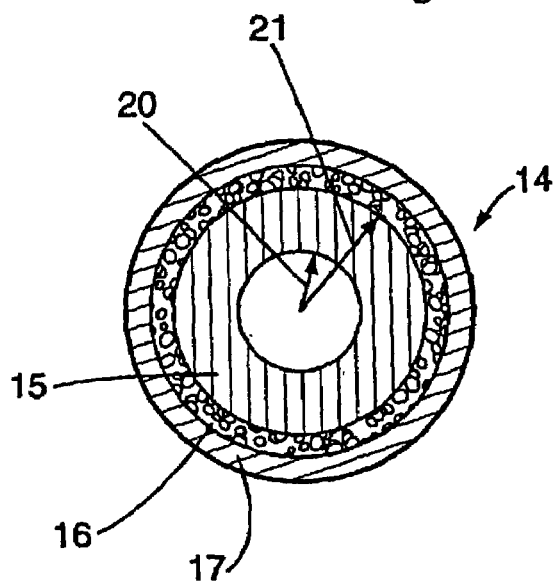
FIG. 3 is an enlarged cross-section taken in the plane of line 3-3 in FIG. 2.

The core preferably has an annular cross section that defines a fluid-carrying conduit within the core, the core having sufficient dimensions to accommodate the high-pressure washing fluid. In preferred embodiments of the invention, the inner radius 20 of the annular core, as shown in FIG. 3, ranges from about 3.2 to about 3.3 mm, and the outer radius 21 ranges from about 4.7 to about 4.8 mm. In other embodiments, the inner radius of the inner core ranges from about 4.1 to 4.2 mm and the outer radius ranges from about 5.4 to about 5.5 mm. While the hose may be provided with a corrugated core (not shown), the core preferably is non-corrugated, and thus has a substantially uniform annular cross section.

With further reference to FIGS. 2 and 3, to increase the burst resistance of the hose, the hose is provided with a flexible reinforcing sheath 16, which covers and preferably is adhesively secured to the core 15. The sheath preferably is of a braided construction, and thus preferably comprises interwoven strands of a reinforcing metallic fibrous material. The metallic material preferably is an anodized a high carbon steel fiber. One preferred steel fiber is sold by Bekaert as a 0.25 mm diameter fiber having a tensile strength in the range from 2750-3050 N/mm$^2$ and a breaking strength of 142 N. Other fibers are contemplated to be useful in conjunction with the invention; for instance, other steel fibers having diameters ranging from 0.20 mm to 0.56 mm, a tensile strength in the range from 2150 to 3350 N/mm$^2$, and a breaking strength of 91-565 N are sold by Bekaert and are deemed useful in conjunction with the invention. Other metallic fibers contemplated to be useful in conjunction with the invention include other metallic fibers of high tensile strength and breaking strength, such as titanium fibers. The tensile strength of the fibers preferably should exceed about 2150 N/mm$^2$ and the breaking strength of the fibers preferably should exceed 90 N.

Generally speaking, the manner in which the braided sheath is applied over the core are conventional. Many conventional hoses are reinforced with a braided sheath that has a braid angle of about 1.40 or less. To minimize bulk and material and maintain maximum flexibility of the reinforcing layer, the braided sheath of the hose of the invention preferably is braided at an angle of at least about 1.41, more preferably a braid angle ranging from about 1.41 to about 1.48. Any suitable number of braids per strand and, more generally, any suitable braiding conditions may be employed. Surprisingly, it has been found that braiding the sheath with a metallic sheathing fiber at such higher braid angles than are conventionally employed will lend a higher burst strength to the hose, and yet will maintain sufficient hose flexibility to allow for use in consumer pressure washing applications and other high pressure applications. The sheathing preferably has a thickness ranging from about 1.0 to about 1.3 mm on a round fiber. If desired, the hose may be provided with a double sheathing layer, although such may detract from the flexibility of the hose.

The braided sheath is preferably adhesively secured to the core layer with a compatible adhesive, which preferably comprises a urethane or acrylate adhesive. One suitable adhesive comprises a mixture of polyurethane and methyl ethyl ketone. The adhesive may be included in any amount sufficient to impart adhesion between the core and sheath, preferably an adhesive strength sufficient to prevent separation of the core from the sheath when the hose is bent.

To prevent damage to the braided layer and to render the hose resistant to abrasion during use, the hose is provided with a jacket layer 17 made of an abrasion-resistant flexible material. The jacket material may be similar or dissimilar to the core material, and thus, for example, the jacket layer may comprise a SANTOPRENE® rubber or a plasticized rigid polymer as described more fully hereinabove. The jacket preferably has a thickness of about 1.0 to about 1.2 mm. The jacket preferably is adhesively secured to the braided sheath with sufficient adhesive to impart adhesion between the jacket and the sheath, preferably sufficient to provide an adhesive strength sufficient to prevent separation between the jacket and sheath when the hose is bent. The adhesive is preferably similar or identical to that used to adhesively connect the sheath and core. The hose preferably is a "non-cooked" hose; that is, it is preferably made by extruding the core, applying adhesive and the sheathing layers, and applying further adhesive and the jacket layer without thermally bonding the layers together.

Figure 4:
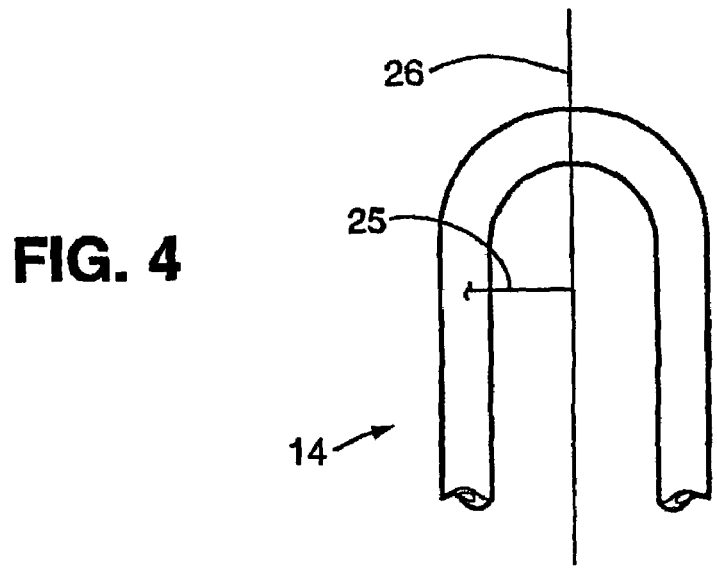
FIG. 4 is a plan view of the hose shown in FIG. 2 when the hose is bent through an angle of 180°.

In accordance with a further feature of the invention, the hose has a minimum bend radius no greater than about 10 times the radius of the hose, and preferably in the range from 6.5 to 8.25 times the radius of the hose. The minimum bend radius may be determined by bending the hose with no fluid contained therein over an angle of 180° and by reducing the size of the bend to as small a diameter as possible without kinking the hose, as shown, for example, in FIG. 4. The minimum bend radius 25 of the hose 14 may be defined as the distance between the central bend line 26 of the bent portion of the hose and the center of the hose, the distance being measured along an angle normal to the bend line 26. Surprisingly, by incorporating a flexible material in the core of the hose of the present invention, a high-pressure hose having a minimum bend radius no greater than about 38 mm while maintaining the ability to accommodate high pressures may be provided. In preferred embodiments, the invention provides a hose that is sized such that the hose has a minimum bend radius no greater than about 36 mm. More preferably, the minimum bend radius is no greater than about 34 mm, and even more preferably, the minimum bend radius is no greater than about 32 mm. The high-pressure hose of the invention will thus be sufficiently flexible for use in consumer pressure washing applications and other high-pressure applications. The minimum bend radius may be, for instance, 6.5 times the radius of the hose; 6.75 times the radius of the hose; 7.0 times the radius of the hose, 7.25 times the radius of the hose; 7.5 times the radius of the hose; 7.75 times the radius of the hose; 8.0 times the radius of the hose; 8.25 times the radius of the hose; 8.5 times the radius of the hose, or any other suitable multiple of the radius of the hose.

The hose will be provided with a hose rating sufficiently below the burst pressure of the hose to leave a 300% margin of safety between the rated pressure and the burst pressure. The burst pressure of the hose is the gauge pressure that the hose will accommodate before bursting. Thus, for example, a hose with a hose rating of 3000 psi will have a burst pressure of at least about 12,000 psi, it being understood that the hose will accommodate pressures of at least 12,000 psi, and possibly higher pressures, before bursting. Preferably, the hose of the invention has a burst pressure of at least about 12,000 psi. More preferably, the hose has a burst pressure of at least about 14,000 psi, even more preferably, the burst pressure is at least about 16,000 psi.

To ensure the structural integrity of the hose, the hose should have a minimum impulse value of at least about 10,000 cycles, more preferably, at least about 20,000 cycles, and most preferably, at least about 30,000 cycles. The impulse value is conventionally defined and refers to the number of cycles for which the hose may be pressurized to its hose rating (i.e., 25% of the burst pressure) and reduced to zero gauge pressure before failure of the hose, each pressurization and depressurization constituting one cycle. The impulse test and equipment for conducting the impulse test are well known in the art.

Most preferably, the hose of the invention is substantially non-deforming, such that the dimensions of the hose do not change when the pressure washer is operated at its rated pressure (i.e., 25% of the burst pressure). In preferred embodiments, the hose of the invention preferably has an elongation at its rated pressure of no more than about 5%, and preferably no more than about 3%. Most preferably, the volumetric expansion of the hose at the rated pressure preferably is no more than about 4.0 cc/ft., more preferably, no more than about 3.8 cc/ft., and most preferably, no more than about 3.5 cc/ft.

The hose finds particular applicability in commercial pressure washers. Other applications, such as hydraulic equipment, also are contemplated.

The following non-limiting Example is provided to illustrate the invention.

EXAMPLE

A high-pressure hose having an inner core composed of linear low-denensity polyethylene, an anodized steel fiber carriage braided sheath, and an outer SANTOPRENE jacket was prepared. The hose had the following principal dimensions and features.

| | |
|---|---|
| OD of hose & Braiding (with Jacket | 13.90 mm |
| OD of hose & Braiding (no Jacket) | 11.44 mm |
| No. Of braids per strand | 8 |
| Gauge of 1 braid | 0.25 mm |
| Inner tube I.D. (with Braiding) | 8.26 |
| Inner tube O.D. - (No braiding) | 10.85 mm |
| Thickness of Inner tube | 1.2 mm |

All pressures stated herein are gauge pressures.

It is this seen that a high pressure hose may be providing in accordance with the teachings herein. In preferred embodiments, the hose may be made very inexpensively relative to conventional hoses that can accommodate like pressures.

The invention claimed is:

1. A high-pressure hose comprising:
   an inner core comprising a flexible material and defining a fluid-carrying conduit; a flexible reinforcing sheath covering said core; said sheath comprising a grid of interwoven strands of a metallic reinforcing fiber material disposed in surrounding relation to said core; and a jacket covering said sheath,
   said hose having a burst pressure of at least about 14,000 psi and a kink free minimum bend radius no greater than about 38 mm as determined by bending the hose with no fluid contained therein over an angle of 180° and by reducing the size of the bend to as small of diameter as possible without kinking the hose.

2. A high-pressure hose according to claim 1, said hose having a burst pressure of at least about 16,000 psi.

3. A high-pressure hose according to claim 1, said sheath having a braid angle of at least about 1.41.

4. A high-pressure hose according to claim 1, said core comprising polyethylene.

5. A high-pressure hose according to claim 1, said core comprising a nylon.

6. A high-pressure hose comprising;
an inner core comprising a flexible material and defining a fluid-carrying conduit; a flexible reinforcing sheath covering said core; said sheath comprising a grid of interwoven strands of a metallic reinforcing fiber material disposed in surrounding relation to said core; and a jacket covering said sheath, said hose having a burst strength of at least about 14,000 psi and a kink free minimum bend radius no greater than about 10 times the radius of said hose as determined by bending the hose with no fluid contained therein over an angle of 1800 and by reducing the size of the bend to as small of diameter as possible without kinking the hose.

7. A high-pressure hose according to claim 6, said hose having a minimum bend radius in the range from about 6.5 to about 8.25 times the radius of said hose.

8. A high-pressure hose according to claim 6, said hose having a burst pressure of at least about 16,000 psi.

9. A high-pressure hose according to claim 6, said sheath having a braid angle of at least about 1.41.

10. A high-pressure hose according to claim 6, said core comprising polyethylene.

11. A high-pressure hose according to claim 6, said core comprising a nylon.

12. A pressure-washing apparatus comprising;
a source of pressurized water; an operator wand; and a hose fluidically connecting said operator wand to said source of pressurized water; said hose comprising;
an inner core comprising a flexible material and defining a fluid-carrying conduit; a flexible reinforcing sheath disposed in surrounding relation to said core;
said sheath comprising a grid of interwoven strands of a metallic reinforcing fiber material; and a jacket covering said sheath,
said hose having a burst pressure of at least about 14,000 psi and a minimum bend radius no greater than about 38 mm at ambient pressure as determined by bending the hose with no fluid contained therein over an angle of 180° and by reducing the size of the bend to as small of diameter as possible without kinking the hose.

13. A high-pressure hose according to claim 12, said hose having a burst pressure of at least about 16,000 psi.

14. A high-pressure hose according to claim 12, said sheath having a braid angle of at least about 1.41.

15. A high-pressure hose according to claim 12, said core comprising polyethylene.

16. A high-pressure hose according to claim 12, said core comprising a nylon.

17. A pressure-washing apparatus comprising:
a source of pressurized water; an operator wand; and a hose fluidically connecting said operator wand to said source of pressurized water; said hose comprising;
an inner core comprising a flexible material and defining a fluid-carrying conduit; a flexible reinforcing sheath disposed in surrounding relation about said core;
said sheath comprising a grid of interwoven strands of a metallic reinforcing fiber material; and a jacket covering said sheath, said hose having a burst strength of at least about 14,000 psi and a minimum bend radium no greater than about 10 times the radius of said hose as determined by bending the hose with no fluid contained therein over an angle of 180° and by reducing the size of the bend to as small of diameter as possible without kinking the hose.

18. A high-pressure hose according to claim 17, said hose having a burst pressure of at least about 16,000 psi.

19. A high-pressure hose according to claim 17, said sheath having a braid angle of at least about 1.41.

20. A high-pressure hose according to claim 17, said core comprising polyethylene.

21. A high-pressure hose according to claim 17, said core comprising a nylon.

22. A high-pressure hose according to claim 1 in which said hose has a minimum bend radius no greater than 32 mm.

23. A high-pressure hose according to claim 1 in which said hose has a minimum impulse value of at least 10,000 cycles at a pressure level of at least 9,000 psi.

24. A high-pressure hose according to claim 1 in which said hose has a minimum impulse value of at least 10,000 cycles at a pressure level of at least 10,500 psi.

* * * * *

UNITED STATES PATENT AND TRADEMARK OFFICE
CERTIFICATE OF CORRECTION

| | | |
|---|---|---|
| PATENT NO. | : 7,222,644 B2 | Page 1 of 1 |
| APPLICATION NO. | : 10/314565 | |
| DATED | : May 29, 2007 | |
| INVENTOR(S) | : Pianetto et al. | |

It is certified that error appears in the above-identified patent and that said Letters Patent is hereby corrected as shown below:

On title page Item (75) change: "Morgan McCarthey" should read --Morgan McCarthy--.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,222,644 C1 | |
| APPLICATION NO. | : 90/010786 | |
| DATED | : August 16, 2011 | |
| INVENTOR(S) | : Pianetto et al. | |

It is certified that error appears in the above-identified patent and that said Letters Patent is hereby corrected as shown below:

Delete the title page and insert the title page attached.

Signed and Sealed this
Twenty-fourth Day of January, 2012

David J. Kappos
*Director of the United States Patent and Trademark Office*

(12) United States Patent
Pianetto et al.

(10) Patent No.: US 7,222,644 B2
(45) Date of Patent: May 29, 2007

(54) HIGH-PRESSURE HOSE AND PRESSURE WASHER

(75) Inventors: John Pianetto, Hoffman Estates, IL (US); Morgan McCarthy, Schaumburg, IL (US); Gus Alexander, Inverness, IL (US)

(73) Assignee: FAIP North America, Inc., Elk Grove Village, IL (US)

(*) Notice: Subject to any disclaimer, the term of this patent is extended or adjusted under 35 U.S.C. 154(b) by 416 days.

(21) Appl. No.: 10/314,565

(22) Filed: Dec. 9, 2002

(65) Prior Publication Data
US 2004/0124287 A1    Jul. 1, 2004

(51) Int. Cl.
F16L 11/00    (2006.01)

(52) U.S. Cl. .............. 138/127; 138/125; 138/126; 239/351; 239/355

(58) Field of Classification Search ........ 138/125–127; 239/302–379
See application file for complete search history.

(56) References Cited

U.S. PATENT DOCUMENTS

| | | | |
|---|---|---|---|
| 3,580,289 A | 5/1971 | James, Jr. et al. | |
| 4,258,755 A | 3/1981 | Higbee | |
| 4,262,704 A | 4/1981 | Grawey | |
| 4,366,746 A | 1/1983 | Rosecrans | |
| 4,380,252 A | 4/1983 | Gray et al. | |
| 4,384,595 A * | 5/1983 | Washkewicz et al. | 138/127 |
| 4,447,378 A | 5/1984 | Gray et al. | |
| 4,488,577 A | 12/1984 | Shilad et al. | |
| 4,517,039 A * | 5/1985 | Satzler | 156/149 |
| 4,699,178 A | 10/1987 | Washkewicz et al. | |
| 4,898,212 A | 2/1990 | Searfoss et al. | |
| 4,905,736 A * | 3/1990 | Kitami et al. | 138/137 |
| 5,170,011 A | 12/1992 | Martucci | |
| 5,381,834 A | 1/1995 | King | |
| 5,395,052 A | 3/1995 | Schneider et al. | |
| 5,413,147 A | 5/1995 | Moreiras et al. | |
| 5,419,495 A | 5/1995 | Berfield | |
| 5,432,709 A * | 7/1995 | Vollweiler et al. | 702/32 |
| 5,535,177 A * | 7/1996 | Chin et al. | 367/81 |
| 5,573,039 A * | 11/1996 | Mang | 138/141 |
| RE35,527 E | 6/1997 | Martucci | |
| 5,655,572 A | 8/1997 | Marena | |
| 5,728,066 A * | 3/1998 | Daneshvar | 604/96.01 |
| 5,830,946 A * | 11/1998 | Ozawa et al. | 525/65 |
| 5,964,409 A * | 10/1999 | Alexander et al. | 239/154 |
| 6,109,306 A | 8/2000 | Kleinert | |
| 6,166,143 A * | 12/2000 | Watanabe et al. | 525/208 |

(Continued)

FOREIGN PATENT DOCUMENTS

DE    24 29 680    1/1976

(Continued)

Primary Examiner—Thomas Denion
Assistant Examiner—Zelalem Eshete
(74) Attorney, Agent, or Firm—Leydig, Voit & Mayer, Ltd.

(57) ABSTRACT

A flexible pressure-washer hose and pressure washing apparatus are disclosed. The hose is of concentric laminar construction and comprises an inner core, an intermediate metallic sheath covering the core, and a jacket covering the intermediate sheath. The disclosed hose has a burst pressure of at least 12,000 psi, yet is highly flexible. The disclosed pressure washer comprises a hose made in accordance with the invention and fluidically connecting a source of pressurized fluid to an operator wand.

24 Claims, 2 Drawing Sheets

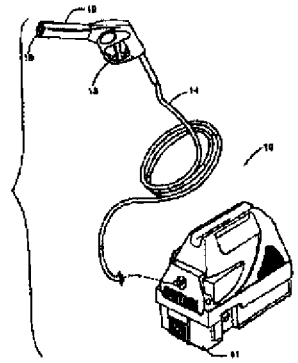

UNITED STATES PATENT AND TRADEMARK OFFICE
CERTIFICATE OF CORRECTION

| | | |
|---|---|---|
| PATENT NO. | : 7,222,644 C1 | Page 1 of 2 |
| APPLICATION NO. | : 90/010786 | |
| DATED | : August 16, 2011 | |
| INVENTOR(S) | : Pianetto et al. | |

It is certified that error appears in the above-identified patent and that said Letters Patent is hereby corrected as shown below:

Delete the title page and insert the title page attached.

This certificate supersedes the Certificate of Correction issued January 24, 2012.

Signed and Sealed this
Fourteenth Day of February, 2012

David J. Kappos
*Director of the United States Patent and Trademark Office*

(12) EX PARTE REEXAMINATION CERTIFICATE (8472nd)
United States Patent
Pianetto et al.

(10) Number: US 7,222,644 C1
(45) Certificate Issued: Aug. 16, 2011

(54) HIGH-PRESSURE HOSE AND PRESSURE WASHER

(75) Inventors: John Pianetto, Hoffman Estates, IL (US); Morgan McCarthy, Schaumburg, IL (US); Gus Alexander, Inverness, IL (US)

(73) Assignee: FAIP North America, Inc., Elk Grove Village, IL (US)

Reexamination Request:
No. 90/010,786, Dec. 22, 2009

Reexamination Certificate for:
Patent No.: 7,222,644
Issued: May 29, 2007
Appl. No.: 10/314,565
Filed: Dec. 9, 2002

Certificate of Correction issued Jan. 19, 2010.

(51) Int. Cl.
*F16L 11/00* (2006.01)

(52) U.S. Cl. .............. 138/127; 138/125; 138/126; 239/351; 239/355

(58) Field of Classification Search .................. None
See application file for complete search history.

(56) References Cited

U.S. PATENT DOCUMENTS

| | | |
|---|---|---|
| 3,725,167 A | 4/1973 | Love |
| 4,553,568 A | 11/1985 | Piccoli et al. |
| 5,380,571 A | 1/1995 | Ozawa et al. |
| 5,419,495 A | 5/1995 | Berfield |
| 5,964,409 A | 10/1999 | Alexander et al. |

*Primary Examiner*—Joseph A. Kaufman

(57) ABSTRACT

A flexible pressure-washer hose and pressure washing apparatus are disclosed. The hose is of concentric laminar construction and comprises an inner core, an intermediate metallic sheath covering the core, and a jacket covering the intermediate sheath. The disclosed hose has a burst pressure of at least 12,000 psi, yet is highly flexible. The disclosed pressure washer comprises a hose made in accordance with the invention and fluidically connecting a source of pressurized fluid to an operator wand.

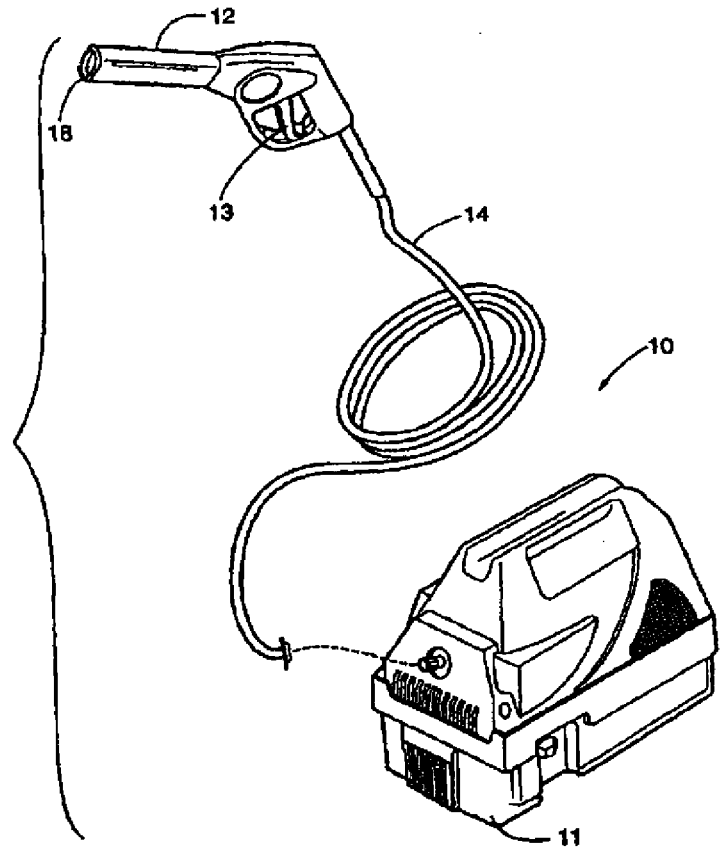

(12) EX PARTE REEXAMINATION CERTIFICATE (8472nd)
United States Patent
Pianetto et al.

(10) Number: US 7,222,644 C1
(45) Certificate Issued: Aug. 16, 2011

(54) HIGH-PRESSURE HOSE AND PRESSURE WASHER

(75) Inventors: John Pianetto, Hoffman Estates, IL (US); Morgan McCarthey, Schaumburg, IL (US); Gus Alexander, Inverness, IL (US)

(73) Assignee: Harris N.A., Chicago, IL (US)

Reexamination Request:
No. 90/010,786, Dec. 22, 2009

Reexamination Certificate for:
Patent No.: 7,222,644
Issued: May 29, 2007
Appl. No.: 10/314,565
Filed: Dec. 9, 2002

Certificate of Correction issued Jan. 19, 2010.

(51) Int. Cl.
*F16L 11/00* (2006.01)

(52) U.S. Cl. .................. 138/127; 138/125; 138/126; 239/351; 239/355

(58) Field of Classification Search .................. None
See application file for complete search history.

(56) References Cited

U.S. PATENT DOCUMENTS

| 3,725,167 A | 4/1973 | Love |
| 4,553,568 A | 11/1985 | Piccoli et al. |
| 5,380,571 A | 1/1995 | Ozawa et al. |
| 5,419,495 A | 5/1995 | Berfield |
| 5,964,409 A | 10/1999 | Alexander et al. |

*Primary Examiner*—Joseph A. Kaufman

(57) ABSTRACT

A flexible pressure-washer hose and pressure washing apparatus are disclosed. The hose is of concentric laminar construction and comprises an inner core, an intermediate metallic sheath covering the core, and a jacket covering the intermediate sheath. The disclosed hose has a burst pressure of at least 12,000 psi, yet is highly flexible. The disclosed pressure washer comprises a hose made in accordance with the invention and fluidically connecting a source of pressurized fluid to an operator wand.

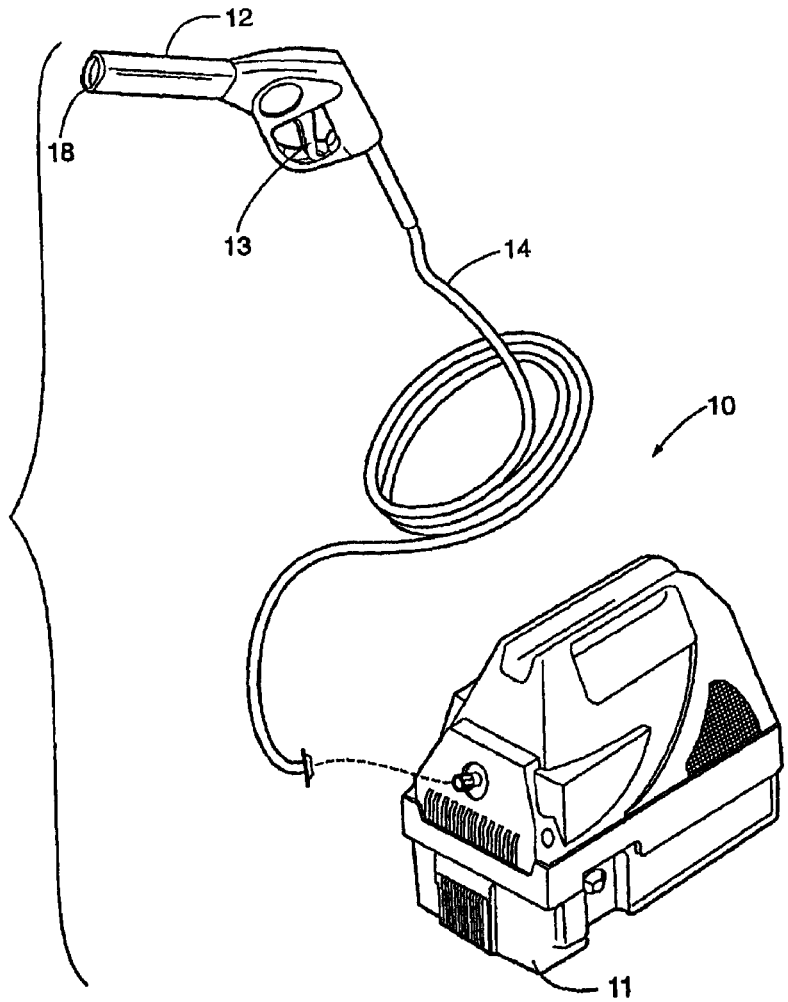

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-11 and 22-24 is confirmed.

Claim 19 is cancelled.

Claims 12 and 17 are determined to be patentable as amended.

Claims 13-16, 18, 20 and 21, dependent on an amended claim, are determined to be patentable.

12. A pressure-washing apparatus comprising;
 a source of pressurized water; an operator wand; and a hose fluidically connecting said operator wand to said source of pressurized water; said hose comprising;
 an inner core comprising a flexible material and defining a fluid-carrying conduit; a flexible reinforcing sheath disposed in surrounding relation to said core;
 said sheath comprising a grid of interwoven strands of a metallic reinforcing fiber material *and being the only reinforcing sheath in the hose*; and a jacket covering said sheath,
 said hose having a burst pressure of at least about 14,000 psi and a minimum bend radius no greater than about 38 mm at ambient pressure as determined by bending the hose with no fluid contained therein over an angle of 180° and by reducing the size of the bend to as small of diameter as possible without kinking the hose.

17. A pressure-washing apparatus comprising:
 a source of pressurized water; an operator wand; and a hose fluidically connecting said operator wand to said source of pressurized water; said hose comprising;
 an inner core comprising a flexible material and defining a fluid-carrying conduit; a flexible reinforcing sheath disposed in surrounding relation about said core;
 said sheath comprising a grid of interwoven strands of a metallic reinforcing fiber material *having a braid angle of at least about 1.41*; and a jacket covering said sheath, said hose having a burst strength of at least about 14,000 psi and a minimum bend radium no greater than about 10 times the radius of said hose as determined by bending the hose with no fluid contained therein over an angle of 180° and by reducing the size of the bend to as small of diameter as possible without kinking the hose.

* * * * *